(12) United States Patent
Deng et al.

(10) Patent No.: US 10,112,463 B2
(45) Date of Patent: Oct. 30, 2018

(54) VEHICLE DOOR BEAM ASSEMBLY

(71) Applicant: Ford Global Technologies, LLC, Dearborn, MI (US)

(72) Inventors: Zhibing Deng, Northville, MI (US); Diego Freitas Araujo, Lauro de Freitas (BR); M. Harish Kumar, Chennai (IN); Michael Tyson, I, Chennai (IN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/298,616

(22) Filed: Oct. 20, 2016

(65) Prior Publication Data

US 2018/0111452 A1    Apr. 26, 2018

(51) Int. Cl.
    *B60J 5/04*    (2006.01)
(52) U.S. Cl.
    CPC ........... *B60J 5/0443* (2013.01); *B60J 5/0437* (2013.01)
(58) Field of Classification Search
    CPC .............................. B60J 5/0443; B60J 5/0437
    See application file for complete search history.

(56) References Cited

U.S. PATENT DOCUMENTS

| | | | |
|---|---|---|---|
| 4,708,390 A | 11/1987 | Palentyn et al. | |
| 5,599,057 A | 2/1997 | Hirahara et al. | |
| 6,382,707 B1* | 5/2002 | Dunneback | B60J 5/0425 |
| | | | 296/146.6 |
| 7,331,626 B2 | 2/2008 | Yoshimoto et al. | |
| 8,272,679 B2 | 9/2012 | Deng et al. | |
| 8,439,428 B2 | 5/2013 | Imamura | |
| 8,727,421 B2 | 5/2014 | Cohoon et al. | |
| 2011/0285175 A1* | 11/2011 | Imamura | B60J 5/0426 |
| | | | 296/193.05 |
| 2015/0123423 A1* | 5/2015 | Hasegawa | B60J 5/0427 |
| | | | 296/146.6 |
| 2015/0258878 A1* | 9/2015 | Sugiyama | B60J 5/0429 |
| | | | 49/505 |

FOREIGN PATENT DOCUMENTS

| | | |
|---|---|---|
| CN | 203047130 U | 7/2013 |
| DE | 4318634 A1 | 12/1994 |
| EP | 0492995 A1 | 7/1992 |
| JP | S63270223 A | 11/1988 |
| KR | 20030088921 A | 11/2003 |
| KR | 1020120019832 A | 3/2012 |
| KR | 1020120129331 A | 11/2012 |

OTHER PUBLICATIONS

UKIPO Search Report for Application No. GB1716756.0 dated Mar. 14, 2018 (4 pages).

* cited by examiner

*Primary Examiner* — D Glenn Dayoan
*Assistant Examiner* — Melissa A Black
(74) *Attorney, Agent, or Firm* — Franl A. MacKenzie; Bejin Bieneman PLC (57) ABSTRACT

A vehicle door includes a door inner, a beam having a first end and a second end spaced from each other along a longitudinal axis, and a bracket. The bracket is fixed to the door inner and the beam, with the bracket between the door inner and the first end of the beam. The beam includes a cutout extending along the longitudinal axis to the first end.

20 Claims, 7 Drawing Sheets

VEHICLE DOOR BEAM ASSEMBLY

BACKGROUND

There may be limited space between an occupant of a vehicle and a vehicle door. Side impacts to a vehicle can result in the vehicle door collapsing toward a passenger cabin of the vehicle. The National Highway Traffic Safety Administration (NHTSA) issued Federal Motor Vehicle Safety Standard (FMVSS) 214 to address side impact protection for vehicles. Specifically, FMVSS 214 sets forth testing standards and measurements for intrusion into the passenger compartment during a side impact.

DETAILED DESCRIPTION

With reference to the Figures, wherein like numerals indicate like parts throughout the several views, a vehicle 10 includes a vehicle body 12 and vehicle doors 20. A vehicle door 20 includes a door outer 22, a door inner 24, and a door beam assembly 28.

The vehicle body 12 includes a frame that may include a roof, a floor, a plurality of pillars, and rocker panels. The vehicle body 12 may have a unibody construction, a body-on-frame construction, or any other suitable construction. The vehicle body 12 may be formed of any suitable material, for example, steel, aluminum, etc.

The door beam assembly 28 includes a beam 30 having a first end 32 and a second end 52 spaced from each other along a longitudinal axis A. The second end 52 of the beam 30 can be fixed to a bracket 54, which may be fixed to the door inner 24. The first end 32 of the beam 30 is fixed to another bracket 36. The bracket 36 is fixed to the door inner 24, with the bracket 36 between the door inner 24 and the first end 32 of the beam 30.

Figure 1:
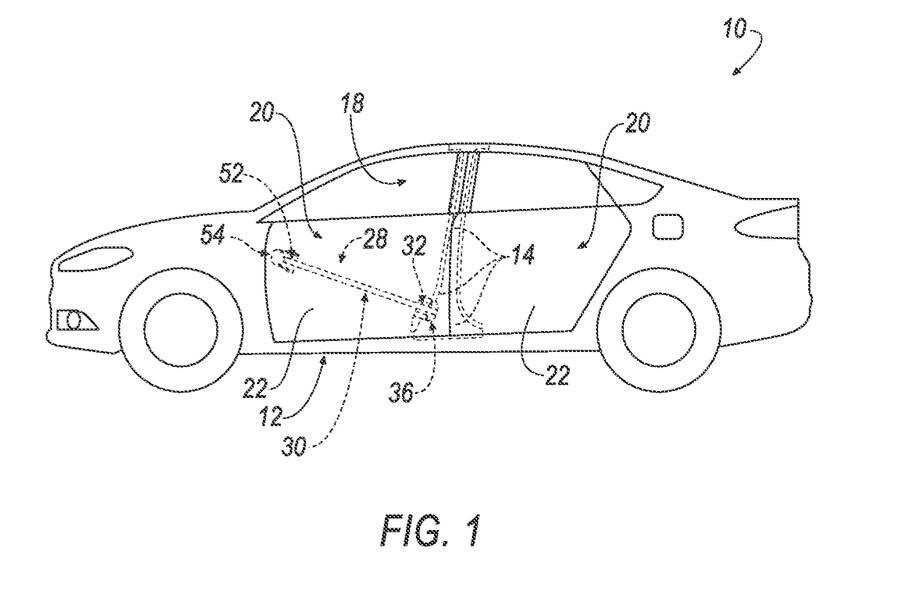
FIG. 1 is a side view of a vehicle including a beam and brackets shown in hidden lines.
Figure 2A:
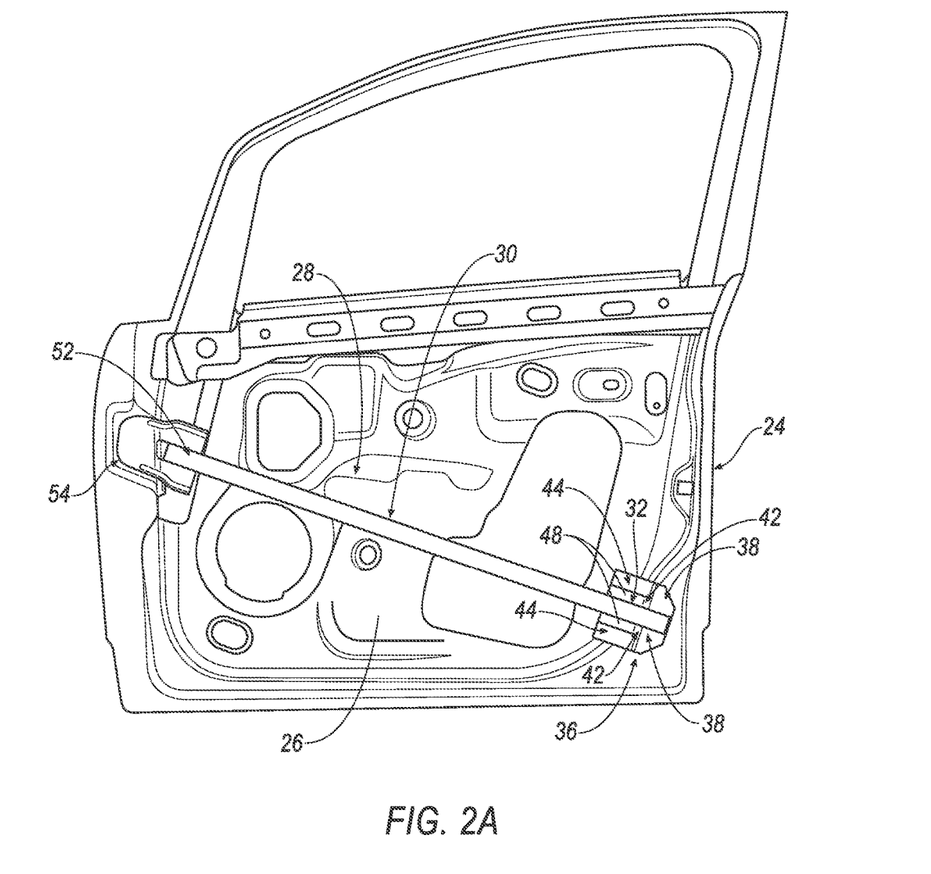
FIG. 2A is a side view of a door inner including the beam and the brackets.
Figure 2B:
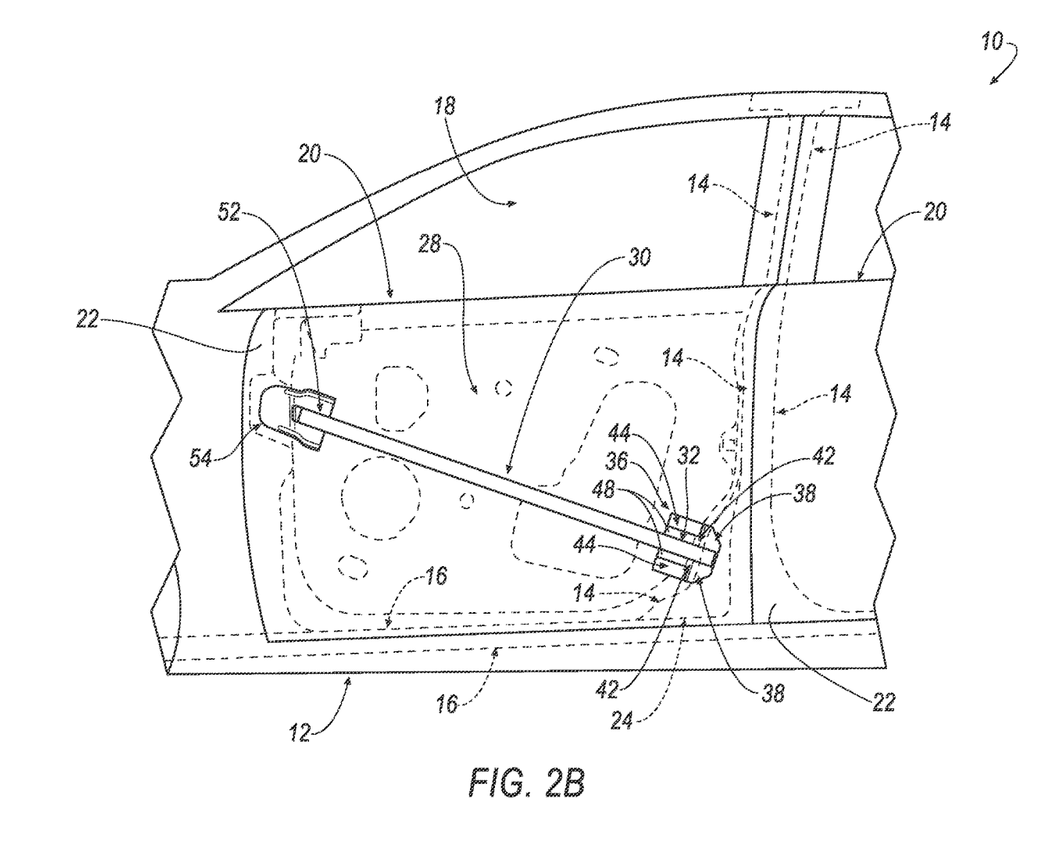
FIG. 2B is a magnified side view of the vehicle of FIG. 1, including a vehicle body, the door inner shown in hidden lines, the beam, and the brackets.

As shown in FIGS. 1 and 2B, when a vehicle door 20 is mounted to an opening in the vehicle body 12 and in a closed position, the door inner 24 overlaps portions of the vehicle body 12. For example, the door inner 24 may overlap a B-Pillar 14 and/or a rocker panel 16 of the vehicle body 12.

Figure 4A:
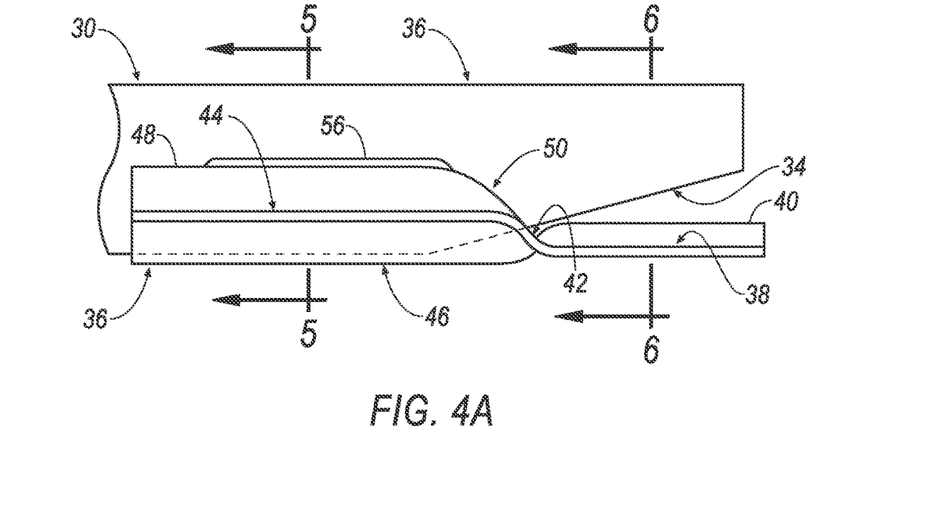
FIG. 4A is a side view of an example of the first end of the beam and the bracket.
Figure 4B:
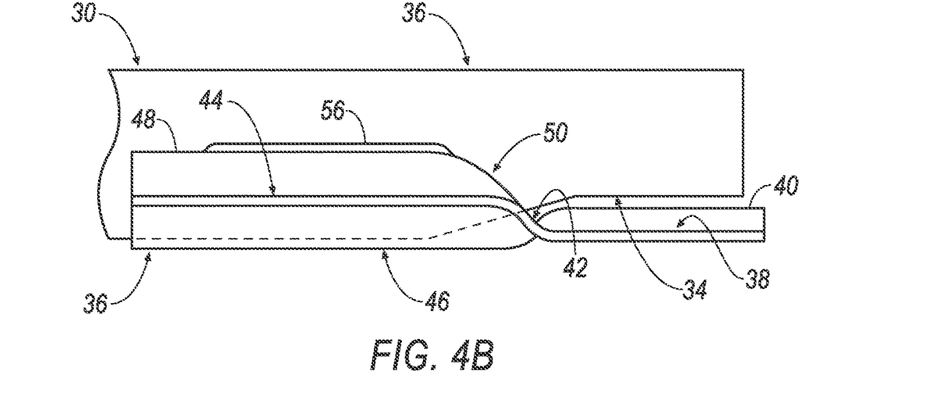
FIG. 4B is a side view of another example of the first end of the beam and the bracket.

As shown in FIGS. 4A-B, the beam 30 includes a cutout 34 extending along the longitudinal axis A to the first end 32. The beam 30 is thinner at the first end 32 relative to a main section of the beam 30 as a result of the cutout 34. Thus, when the first end 32 of the beam 30 is fixed to the bracket 36 and the bracket 36 is fixed to the door inner 24, the beam 30 can overlap the vehicle body 12 at the cutout 34. In this way, the vehicle body 12 may provide additional support for the door beam assembly 28 to assist in reducing intrusions into a passenger cabin 18 of the vehicle 10 from a side impact.

Referring back to FIGS. 1 and 2B, the vehicle 10 includes vehicle doors 20. The vehicle doors 20 generally include the door outer 22 and the door inner 24. The door outer 22 may include an exterior surface of the vehicle 10. The door outer 22 can be formed from metal and/or other suitable materials, such as carbon fiber. The door outer 22, and more specifically an exterior surface of the door outer 22, can have a class-A surface finish, i.e., a surface specifically manufactured to have a high quality, finished aesthetic appearance free of blemishes.

The door inner 24 can be attached to and spaced from the door outer 22. For example, the door outer 22 and the door inner 24 may have respective peripheral edges that can be joined together in a suitable manner, e.g., welding and hemming flange. As discussed above, the door inner 24 can overlap with portions of the vehicle body 12, such as the B-Pillar 14 and/or the rocker panel 16.

Referring to FIG. 2A, the door inner 24 may be a monolithic structure. In other words, the door inner 24 may be formed as a single piece of material. For example, the door inner 24 may be stamped from metal, molded from a polymeric material, such as plastic, etc. The door inner 24 may include a surface (not shown) that faces the passenger cabin 18. The surface can include a class-A finish. The door inner 24 can include another surface 26 that faces the door outer 22 when the door outer 22 and the door inner 24 are joined together.

Alternatively, the door inner 24 may be formed from multiple pieces of material. For example, two or more structures may be sandwiched together to form the door inner 24, with each of the structures formed of different materials. In this instance, the surface facing the passenger cabin may be formed from plastic as described above. The surface 26 facing the door outer 22 can be formed of metal and/or other suitable materials.

The door beam assembly 28 can be between the door outer 22 and the door inner 24, and fixed to the door inner 24. For example, the brackets 36, 54 of the door beam assembly 28 can be fixed to the surface 26 of the door inner 24 by welding, such as spot welding. Alternatively, the brackets 36, 54 may be fixed to the surface 26 of the door inner 24 using fasteners, adhesives, or other suitable means.

As discussed above, the beam 30 of the door beam assembly 28 extends along the longitudinal axis A between the first end 32 and the second end 52. The first end 32 is fixed to the bracket 36. The second end 52 is fixed to the bracket 54. When the vehicle door 20 is mounted to the vehicle 10 and the door beam assembly 28 is fixed to the door inner 24, the bracket 54 and second end 52 of the beam 30 may be in a vehicle-forward position relative to the bracket 36 and the first end 32. The door beam assembly 28 may extend diagonally from a vehicle-forward to a vehicle rearward direction.

For example, the bracket 54 and second end 52 of the beam 30 can be fixed to an upper, vehicle-forward region of the door inner 24, and the bracket 36 and the first end 32 of the beam 30 can be fixed to a lower, vehicle-rearward region of the door inner 24. Alternatively, the bracket 54 and second end 52 of the beam 30 can be fixed to a lower, vehicle-forward region of the door inner 24, and the bracket 36 and the first end 32 of the beam 30 can be fixed to an upper, vehicle-rearward region of the door inner 24.

Alternatively, the brackets 36, 54 of the door beam assembly 28 can be fixed to the door inner 24 such that the door beam assembly 28 extends substantially horizontally, i.e., a vehicle fore-and-aft direction.

Although FIGS. 1 and 2B illustrate the vehicle 10 as a sedan, the vehicle 10 may include any passenger or commercial automobile such as a car, a truck, a sport utility vehicle, a crossover vehicle, a van, a minivan, a taxi, a bus, etc. Additionally, while the door beam assembly 28 in the Figures is shown only in a front, driver-side door, the door beam assembly 28 may be included in some or all of the vehicle doors 20 of the vehicle 10.

Figure 3:
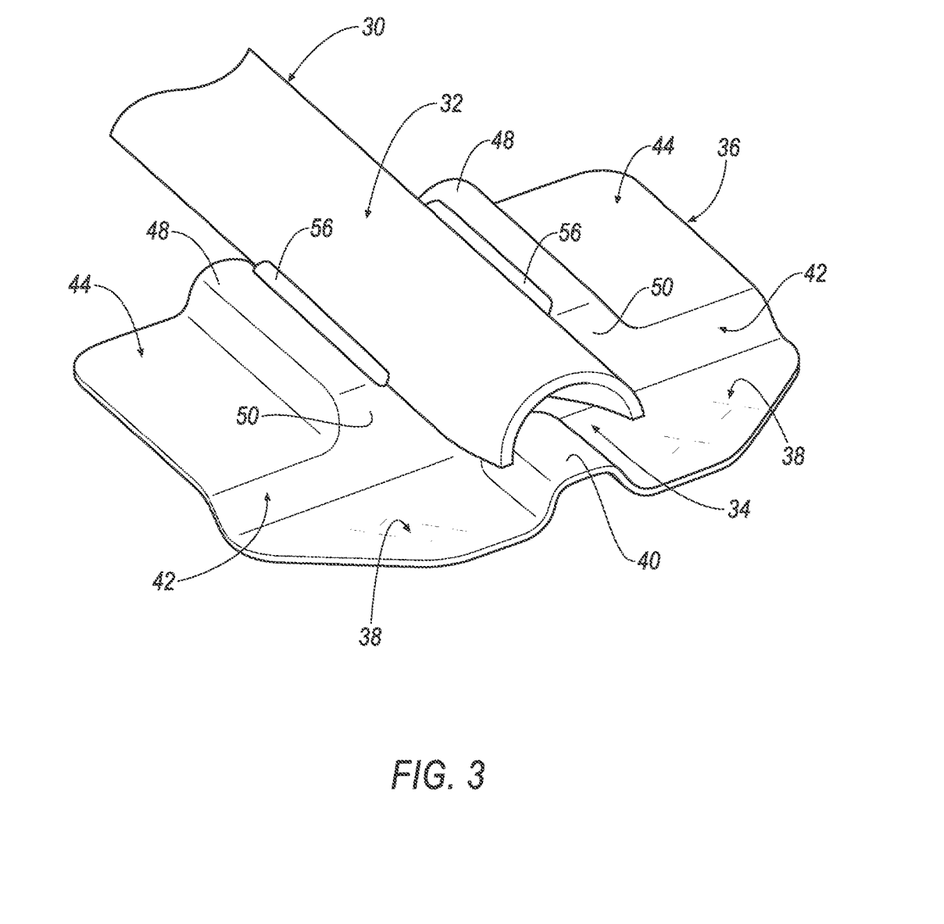
FIG. 3 is a perspective view of a first end of the beam and the bracket.

As shown in FIGS. 3-4B, the first end 32 of beam 30 includes the cutout 34 extending along the longitudinal axis A of the beam 30, with the beam 30 fixed to the bracket 36. The second end 52 of the beam 30 may be fixed to the bracket 54.

The beam 30 can have a tubular configuration, as shown in FIGS. 2A, 2B, 3, 5, and 6. Alternatively, the beam 30 may have other configurations, such as rectangular, square, polygonal, etc. The beam 30 may have a hollow cross-section from the first end 32 to the second end 52, a solid cross-section from the first end 32 to the second end 52, or a partially hollow and a partially solid cross-section between the first end 32 and the second end 52. The beam 30 may be manufactured from a single piece of material, and can be formed of metal, such as steel or aluminum, plastic, a carbon fiber composite, etc.

As discussed above, the first end 32 of the beam 30 includes the cutout 34. The cutout 34 may taper along the longitudinal axis A of the beam 30 in a direction toward the first end 32 of the beam 30. The taper of the cutout 34 may be constant, as shown in FIG. 4A. As shown in FIG. 4B, the cutout 34 can include a tapered portion that extends to a second portion of the cutout 34, with the second portion of the cutout 34 extending parallel to the longitudinal axis A of the beam 30 to the first end 32 of the beam 30. Alternatively, the taper of the cutout 34 may be curvilinear or any other suitable configuration. As shown in FIGS. 3-4B, the cutout 34 can face the bracket 36.

The second end 52 of the beam 30 may include a cutout (not shown) in addition to or instead of the cutout 34 at the first end 32. The cutout at the second end 52 of the beam 30 may taper along the longitudinal axis A of the beam 30 in a direction toward the second end 52. The taper of the cutout at the second end 52 may be constant, like the cutout 34 shown in FIG. 4A. As shown in FIG. 4B, the cutout at the second end 52 can include a tapered portion that extends to a second portion of the cutout at the second end 52, with the second portion of the cutout extending parallel to the longitudinal axis A of the beam 30 to the second end 52 of the beam 30. Alternatively, the taper of the cutout at the second end 52 may be curvilinear or any other suitable configuration. The cutout at the second end 52 of the beam 30 may be the same as or different from the cutout 34 at the first end 32. In either case, the cutout at the second end 52 of the beam 30 can face the bracket 54.

When the second end 52 of the beam includes the cutout, and the second end 52 of the beam 30 is fixed to the bracket 54 and the bracket 54 is fixed to the door inner 24, the beam 30 can overlap the vehicle body 12 at the cutout. For example, the beam 30 can overlap an A-Pillar of the vehicle 10 and/or the rocker panel 16, depending on where the bracket 54 is fixed to the door inner 24.

As shown in FIGS. 3-7, the bracket 36 fixed to the first end 32 of the beam 30 can include a base 38, a ramp 42, and a platform 44. The beam 30 can be fixed to the platform 44 of the bracket 36 with welds 56, such as MIG welds, as shown in FIG. 3. Alternatively, the beam 30 can be fixed to the platform 44 of the bracket 36 using fasteners, adhesives, and the like.

The platform 44 may include one or more support ribs 48. The support ribs 48 extend in a direction parallel to the longitudinal axis of the beam 30 when the beam 30 is fixed to the bracket 36. When the platform 44 includes one support rib 48, the beam 30 can be fixed to the support rib with welds, fasteners, adhesives, etc.

When the platform 44 of the bracket 36 includes two support ribs 48, as shown in FIGS. 3 and 5-7, the support ribs 48 can extend in a direction parallel to the longitudinal axis of the beam 30 when the beam 30 is fixed to the bracket 36. The support ribs 48 may extend along a length of the platform 44, and can include ramped ends 50 adjacent the ramp 42 that connects the platform 44 to the base 38.

The support ribs 48 can be spaced from each other such that the beam 30 may be inserted between them. In this way, the beam 30 can be welded or otherwise fixed to each of the support ribs 48 as discussed above.

As shown in FIGS. 4A-7, the platform 44 can include a trough 46. The trough 46 can be located adjacent one support rib 48. When the platform 44 includes two support ribs 48, the trough 46 can be between the support ribs 48, extending from one support rib 48 to the other support rib 48. The trough 46 can be sized to accommodate the beam 30, and extends in a direction parallel to the longitudinal axis A of the beam 30 when the beam is disposed in the trough 46.

As discussed above, the ramp 42 of the bracket 36 connects the platform 44 and the base 38. The ramp 42 extends away from the platform 44 at an angle to the base 38. The ramp 42 can allow the bracket 36 to follow contouring of the door inner 24. As shown in FIGS. 2A-B, for example, the surface 26 of the door inner 24 includes a ramp proximate where the bracket 36 is fixed to the door inner 24. Accordingly, the ramp 42 can allow the platform 44 and the base 38 of the bracket 36 to seat on the door inner 24.

It should be understood that the ramp 42 is an optional feature of the bracket 36. In other words, depending on the contouring of the door inner 24, the bracket 36 may not include the ramp 42. Alternatively, the ramp 42 may have a different length and/or extend away from the platform 44 to the base 38 at different angles than the ramp 42 shown in the Figures.

Figure 5:
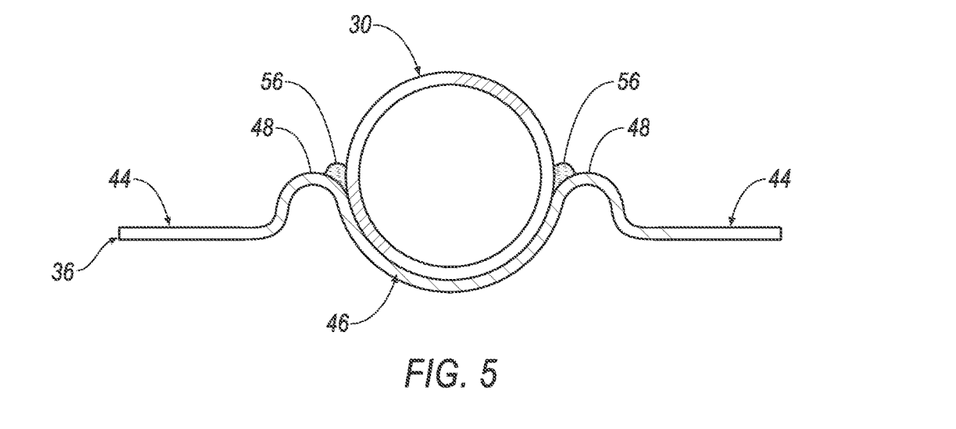
FIG. 5 is a cross-sectional view of the beam and the bracket taken along line 5 of FIG. 4A.
Figure 6:
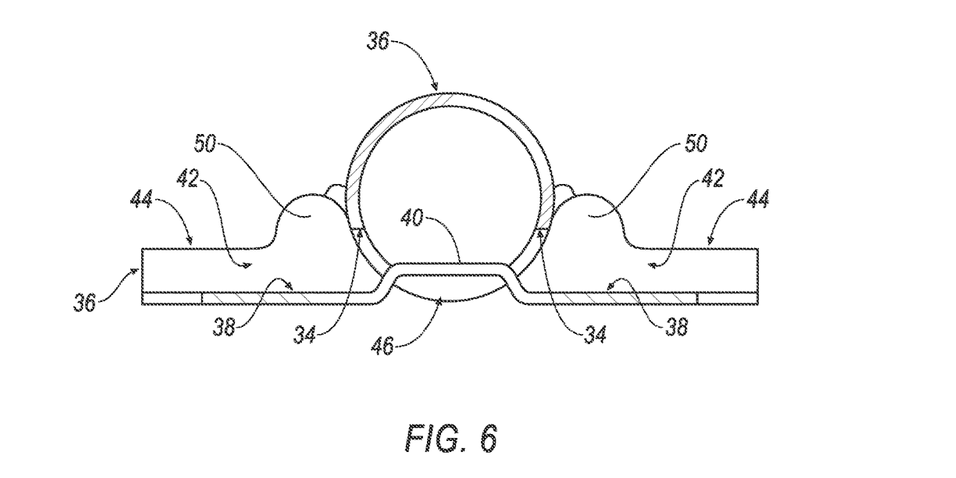
FIG. 6 is a cross-sectional view of the first end of the beam and the bracket taken along line 6 of FIG. 4A.
Figure 7:
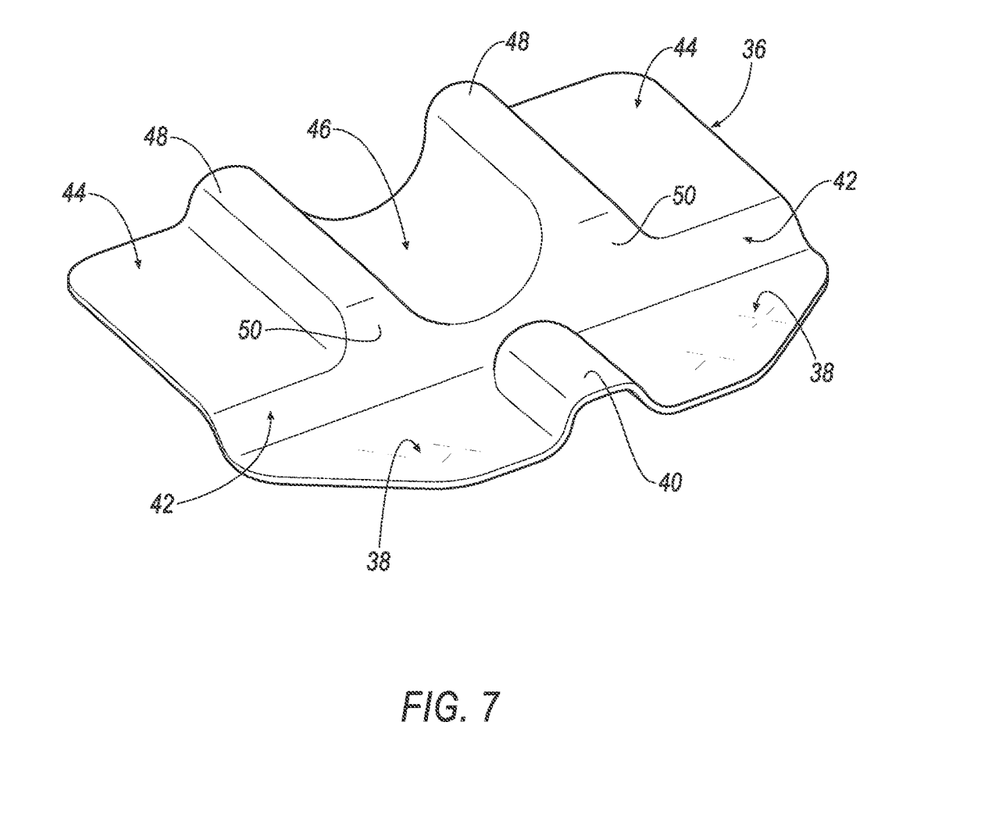
FIG. 7 is a perspective view of the bracket.

The base 38 of the bracket 36 extends away from the ramp 42, as discussed above. The base 38 can include a reinforcing rib 40. As shown in FIGS. 3-4B, the reinforcing rib 40 can extend in a direction parallel to the longitudinal axis A of the beam 30 when the beam 30 is fixed to the bracket 36, and may taper in a direction toward the ramp 42. Alternatively, the reinforcing rib 40 may extend at an angle relative to the longitudinal axis A. As shown in FIG. 5, the reinforcing rib 40 of the base 38 can be located between the cutout 34 in the beam 30, and, in addition, located between the beam 30 and the door inner 24.

The bracket 36 may be formed of metal, such as steel, aluminum, etc., or other suitable materials. The bracket 36 is fixed to the door inner 24, e.g., to the surface 26 of the door inner 24. For example, the bracket 36 may be welded to the door inner 24. Alternatively, the bracket 36 may be fixed to the door inner 24 using fasteners, adhesives, and combinations thereof, including welds.

The bracket 54 to which the second end 52 of the beam 30 may be fixed to the door inner 24. The bracket 54 may include the same features as bracket 36, as discussed above.

The bracket 54 can be fixed to the door inner 24 using welds, fasteners, adhesives, and combinations thereof.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle door comprising:
a door inner including a bottom end;
a beam having a first end and a second end spaced from each other along a longitudinal axis;
a bracket fixed to the door inner at the bottom end and the beam with the bracket between the door inner and the first end of the beam; and
wherein the beam has a cutout extending along the longitudinal axis at the first end; and
wherein the bracket includes a base, a platform fixed to the beam, and a ramp extending from the base to the platform.

2. The vehicle door of claim 1, wherein the cutout tapers along the longitudinal axis to the first end.

3. The vehicle door of claim 1, wherein the cutout faces the bracket.

4. The vehicle door of claim 1, wherein the bracket includes a reinforcing rib between the door inner and the beam at the cutout.

5. The vehicle door of claim 4, wherein the reinforcing rib is elongated along the longitudinal axis.

6. The vehicle door of claim 4, wherein the bracket includes two support ribs spaced from each other, the beam being disposed between and fixed to the support ribs.

7. The vehicle door of claim 6, wherein the reinforcing rib extends between the two support ribs.

8. The vehicle door of claim 1, wherein the bracket includes two support ribs spaced from each other, the beam being disposed between and fixed to the support ribs.

9. The vehicle door of claim 8, wherein the two support ribs are elongated along the longitudinal axis.

10. The vehicle door of claim 8, wherein the bracket includes a trough between the two support ribs, the beam being disposed in the trough.

11. The vehicle door of claim 1, wherein the bracket includes two support ribs on the platform, the support ribs being spaced from each other, the beam being disposed between and fixed to the support ribs.

12. The vehicle door of claim 11, wherein each support rib includes a ramped end at the ramp.

13. The vehicle door of claim 1, wherein the bracket includes a reinforcing rib on the base between the door inner and the beam at the cutout.

14. The vehicle door of claim 13, wherein the reinforcing rib tapers toward the ramp.

15. The vehicle door of claim 1, wherein the beam is hollow and cylindrical.

16. A vehicle body structure comprising:
a body;
a door supported by the body and moveable relative to the body to a closed position;
a beam having a first end and a cutout at the first end; and
a bracket including a base fixed to the door and a platform fixed to the beam, the base extending parallel to the platform;
wherein the bracket and the first end of the beam overlap the body in a cross-vehicle direction and the first end of the beam overlaps the base in the cross-vehicle direction when the door is in the closed position.

17. The vehicle body structure of claim 16, wherein the beam is elongated along a longitudinal axis and cutout tapers along the longitudinal axis to the first end.

18. The vehicle body structure of claim 16, wherein the cutout faces the bracket.

19. The vehicle body structure of claim 16, wherein the body is at least one of a pillar and a rocker panel.

20. A vehicle body structure comprising:
a body;
a door supported by the body and moveable relative to the body to a closed position;
a beam having a first end and a cutout at the first end; and
a bracket fixed to the door and the beam;
wherein the bracket and the first end of the beam overlap the body in a cross-vehicle direction when the door is in the closed position; and
wherein the bracket includes a base, a platform fixed to the beam, and a ramp extending from the base to the platform.

* * * * *